A. & W. P. Haskell,
Making Shoe Lasts.
Nº 16,917.           Patented Mar. 31, 1857.

UNITED STATES PATENT OFFICE.

ALANSON HASKELL AND WM. P. HASKELL, OF NORTH BROOKFIELD, MASSACHUSETTS.

MACHINE FOR MANUFACTURING SHOE-LASTS.

Specification of Letters Patent No. 16,917, dated March 31, 1857.

*To all whom it may concern:*

Be it known that we, ALANSON HASKELL and WILLIAM P. HASKELL, of North Brookfield, in the county of Worcester and State of Massachusetts, have invented a new and useful Machine for Forming Heels and Toes of Lasts; and we do hereby declare that the following is a full, clear, and exact description of the construction and operation of the same, reference being had to the accompanying drawings, in which—

Figure 1:
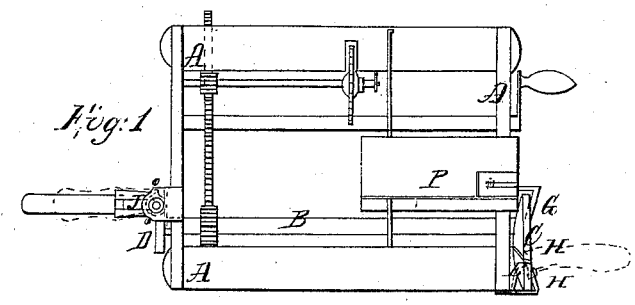
Figure 2:
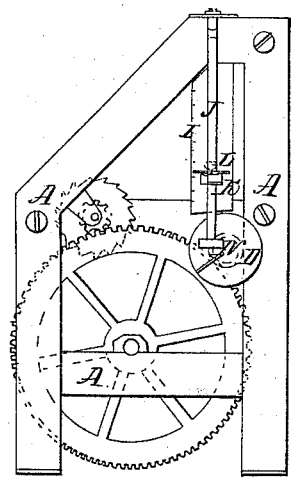
Figure 3:
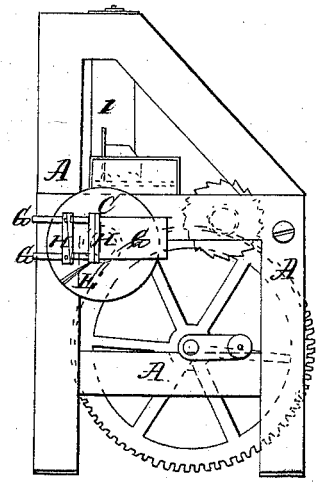
Figure 4:
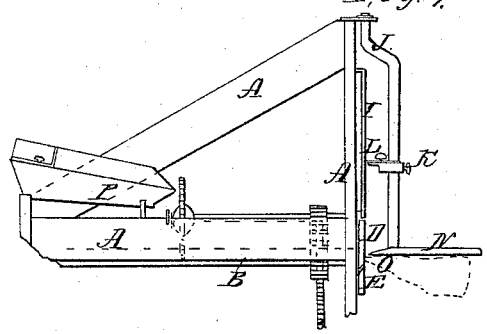
Figure 5:
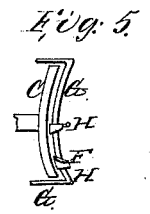

Figure 1 shows a plan or view from above, Figs. 2 and 3 are side views, Fig. 4 is an end view showing the guide lever and pattern slide for the toe, Fig. 5 shows some parts hereinafter to be described.

The same letters denote the same parts where they occur in all.

To construct our machine, place in a suitable frame A A the shaft B to which attach the heads C and D, the shaft receiving motion by any of the common methods. The head C make with a concave face with a radius of about sixteen inches for ordinary sized lasts (though when large or small lasts are exclusively made the radius should be a little larger or smaller) in this head put one or more cutters E where edges correspond to the concave of the head, and make the rest G to fit near the face of the head the parts H, H, being adjustable on the double part of G and their adjacent faces sloping or bended to an edge or they may be curved as seen at F Fig. 5 which shows a section of them, this curve or bevel is made more abrupt at the bottom and flatter at the top to correspond partially with the form of the heel of the last, the rest G being firmly attached to and supported by the frame work. The head D make with a flat face and with one or more cutters corresponding to it, and to the frame above the head D attach the plate I its surface in the same plane as the face of the head or in other words on a line with it. Make the guide lever J, of the form shown in Fig. 4, that is so that its lower part shall hang parallel to the surface of the plate I a short distance from it, and its upper end be pivoted or hung above the plate so that its center of motion shall be on a line with it. The lower part of the lever make square or so as to hold the pattern slide K, to correspond with its bend, the slide being adjustable along that part of the lever and having a screw or clamp to hold the pattern L, securely, to the bottom of the lever J, attach the piece N to form a support to hold the last by it having points on its under surface to assist in steadying it and guides O O to assist in placing the last true. the lever being hung so that the head cuts toward it. In the other part of the frame place a circular saw with its shaft, and having an inclined gaged slide P, so as to cut off the extra length at the toe after trimming the heel, the inclination making the cut about square with the sole and the gage giving the length.

The operation is, as follows. The workman takes the last as turned and holding it with the sole upward places the heel between the guides H H resting or steadying it on the rest G presses it against the cutters at the same time turning it to the right and left, the guides H H having been set so as to allow only the stub-shaft to project to the cutter, they give the true curve horizontally and the concave of the head gives the other, then placing the last on the slide P moves it by the saw cutting it the proper length, and then placing with the sole up under the piece N so as to just touch the head D the lever being square to the plate I and a pattern on the slide K which is then adjusted according to the number of the last, the placing it higher giving by the peculiar construction of the lever J a broad toe and placing it down giving a narrow one, thus making all the necessary variations from one pattern, and the end of the toe not affected by the change of the pattern which is only changed for the different styles or fashions, as square, round, broad, narrow, pointed, etc.

It will be seen that the variation of the curve or level of the guides H, H, gives the necessary conical curve to the heel or in other words one larger nearest the sole, and also that by a little variation of the hand in holding the last more or less may be cut away on either part so as to make a smaller curve for small lasts, though it is better to make a head of smaller radius for that purpose.

What we claim as new and desire to secure by Letters Patent is,

1. The use of the concave head in connection with the adjustable guides and rest, when constructed and operating substantially as above described.

2. We claim so constructing and hanging the bent lever or its equivalent as to allow the same pattern to be used for the different sizes the position of the pattern governing the size substantially as described.

3. We claim the combination of the lever J plate I and cutter head, when constructed and operating substantially as above set forth and described.

In testimony whereof we have hereunto set our hands in the presence of two witnesses.

ALANSON HASKELL.
WILLIAM P. HASKELL.

Witnesses:
C. H. JACKSON,
HIRAM KNIGHT.